Sept. 30, 1924.
J. H. GRAHAM
BICYCLE PEDAL
Filed May 24, 1922
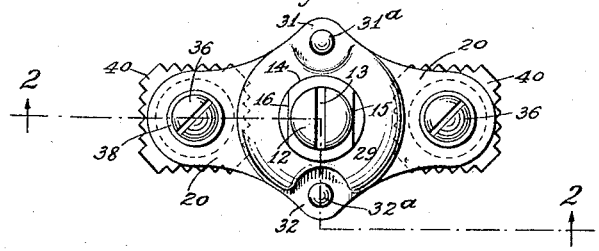
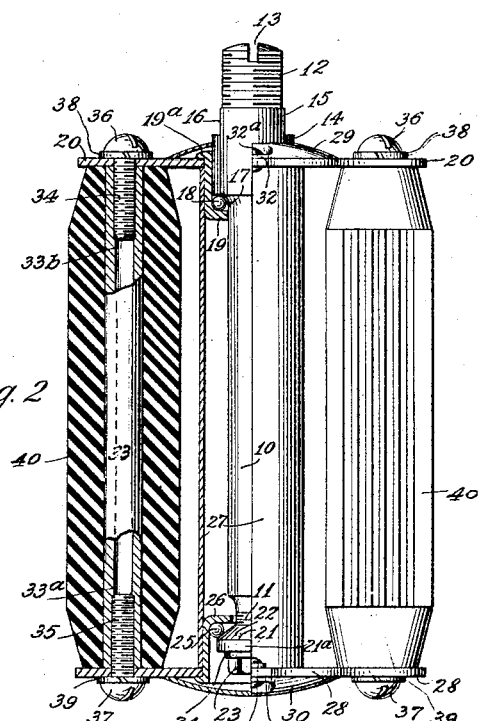
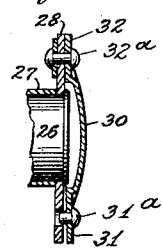
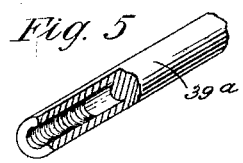
INVENTOR.
James H. Graham
BY H. G. Manning
ATTORNEY Patented Sept. 30, 1924.

1,509,834

UNITED STATES PATENT OFFICE.

JAMES H. GRAHAM, OF TORRINGTON, CONNECTICUT, ASSIGNOR TO J. H. GRAHAM COMPANY, OF TORRINGTON, CONNECTICUT, A CORPORATION OF CONNECTICUT.

BICYCLE PEDAL.

Application filed May 24, 1922. Serial No. 563,401.

*To all whom it may concern:*

Be it known that I, JAMES H. GRAHAM, a citizen of the United States, and a resident of Torrington, county of Litchfield, and State of Connecticut, have invented certain new and useful Improvements in Bicycle Pedals, of which the following is a specification.

This invention relates to bicycles, and more particularly to an improved form of pedal having a tread of rubber or similar material.

One object of this invention is to provide a pedal having an improved form of tread-mounting.

A further object is to provide a pedal in which the rubber tread members may be readily removed without disturbing the adjustment of the pedal upon the crank rod.

A further object is to provide an improved form of dust-cap and mounting.

A further object is to provide an improved construction of the central pedal sleeve which may be made at less expense, and which will have greater rigidity and strength than in former pedals.

With these and other objects in view, there have been illustrated on the accompanying drawings two forms in which the invention may be conveniently embodied in practice.

Fig. 1 represents a view of one end of a pedal embodying the principles of this invention.

Fig. 2 is a bottom plan view of the pedal taken along the line 2—2, looking in the direction of the arrows.

Fig. 3 is an end view of the other end of the pedal.

Fig. 4 is a sectional view of the cone brace member and dust-cap taken along the line 4—4 of Fig. 3, looking in the direction of the arrows.

Fig. 5 is a perspective view, partly broken away, of a modified form of tread rod.

Fig. 6 is a perspective view on a reduced scale of the cone end of the axle, showing the washer in detached position.

In former types of pedals having treads of rubber or similar material, it has been customary to mount the treads upon bolts having heads upon one end and nuts upon the other, or upon bolts having nuts on both ends. In both of these types of pedal, the bolts passed through the brace members at the ends of the pedal, and when it was desired to replace a tread, it was necessary to slide the entire bolt longitudinally out of the brace members in order to release the tread from the pedal.

Moreover, in such former types of pedals, when it was desired to remove the dust cap, it was necessary to first remove the nuts from the ends of the tread-holding bolts, which operation was quite apt to disturb the adjustment of the treads.

By means of the present invention, the above and other disadvantages have been largely if not entirely avoided. This has been accomplished by mounting the treads on rods which extend only to the inside faces of the brace members against which they are held by screw bolts. By means of this construction, it is now possible to replace the treads merely by moving the tread rods transversely to the brace members before slipping off the treads.

Dust caps have been provided upon both ends of the pedal and have been so arranged that they may be removed independently of the tread members and without in any way disturbing the adjustment of said tread members. The bearing of the pedal is made still further dust-proof and the brace members are stiffened by providing an elongated form of central sleeve which extends the full distance between the brace members and entirely covers the ball cups.

Referring now to the drawings in which like reference numerals denote corresponding parts throughout the several views, the numeral 10 represents the pedal pin which is provided with a reduced threaded section 11 on its cone end, and a slightly enlarged threaded section 12 upon its stud end. The threaded section 12 has a slot 13 formed in its end for engagement with a screw-driver or other suitable tool for convenience in manipulation. The threaded section 12 is adapted to be screwed into the bicycle crank, not shown. Adjacent the threaded section 12, the pin 10 is provided with an enlarged cylindrical portion 14 having a pair of parallel longitudinal flat faces 15 and 16 formed thereon.

Between the enlarged cylindrical portion 14 and the central cylindrical portion, the pin has an annular curved ball-bearing track 17 adapted to engage one side of a series of balls 18. The opposite sides of the balls 18 are held in place by a ball cup 19, the sides and base of which fit over the cylindrical portion of the enlarged section 14 and the central portion of the pin respectively. A flange 19a is formed on the rim of the ball cup 19, forming a shoulder which seats upon the edge of a central aperture in a brace member 20.

A cone member 21 is adjustably threaded on the outer reduced threaded end 11 of the pin 10. This cone member 21 comprises a short cylindrical section 21a and an inwardly tapered ball-bearing section 22. The cone member 21 is held securely in adjusted position by means of a nut 23 and a D-washer 24, the latter being nonrotatively mounted on a flattened section 24a of the stud end of the axle. The cone member 21 is adapted to engage a series of balls 25 seated in a ball cup 26 of identical construction with the ball cup 19 previously described.

For strengthening the construction, and to make the pedal more dust-proof, a central tube 27 is provided, surrounding the pin and seated on the outside of the ball cups 19 and 26.

The central tube 27 which is preferably cylindrical and constructed by bending from a strip of sheet steel, may if desired, extend the entire distance from the inner edge of the stud brace member 20 to the inner edge of a cone brace member 28.

The pedal is provided with a pair of dust-caps 29 and 30 at the stud end and cone end of the pin respectively. Each dust-cap 29 and 30 is preferably formed in the shape of a section of a hollow sphere and has side flat projecting portions 31, 32. The flat projecting portions 32 are adapted to be secured to the brace members 20 and 28 by means of rivets 32a on the portions 32, while the other flat projecting portion 31 may be provided with a stud 31a which is adapted to snap into a suitable hole in the brace member. If desired, screws or screw bolts may be substituted for the rivets 31a and studs 32a. The dust-cap 29 is apertured at its center so that it may fit about the cylindrical portion 14 at the stud end of the pin.

Tread rods 33, 33 are provided at both sides of the pin, and extend the entire distance between the brace members 20 and 28. Each of the tread rods 33 is hollow throughout its length and is provided with interior threaded sections 33a and 33b at the cone end and stud end respectively for receiving the ends of threaded rod screws 35 and 34. The hollow construction of the tread rods 33 permits the use of screws of various lengths, and permits the turning up of the screws to various extents for compensating for any inequalities in the interfitting parts. The screws 34 and 35 are provided with heads 36 and 37 located outside the brace members 20 and 28, and seated on lock-washers 38 and 39.

In Fig. 5, a modified form of solid tread rod 39a is illustrated. This form of rod is solid throughout its length except for its ends which are tapped with threads to receive the screws 34 and 35 exactly as in the first described type of tread rod.

Surrounding each of the tread rods 33 is a tread member 40 rectangular in shape, having frusto-conical ends and a series of longitudinal anti-slip grooves in each face thereof. The tread members are preferably made from rubber composition, but it will be understood that any other suitable material may be employed.

In operation, when it is desired to install a new tread on one side of the pedal, the screws 34 and 35 will first be removed. The tread rod 33 may then be moved transversely out from its position between the brace members 20 and 28. The tread 40 may then be readily slipped off the rod 33 and a new tread slipped on in its place. To replace the rod and new tread, it will then only be necessary to reverse the steps just described.

When it is desired to take apart the entire pedal for cleaning and oiling, all of the rod screws 34 and 35 will first be removed. Next, the dust cap at the cone end of the pedal will be taken off. The nut 23 and cone member 21 will then be unscrewed and removed from the pin. The parts of the device may then be readily separated from one another. To assemble the pedal, the operations just described will be reversed.

When it is merely desired to oil the pedal, it will only be necessary to lift the stud on the dust-cap at the cone end and swing the dust-cap to one side. A suitable lubricant may then be introduced.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a bicycle pedal, a pin adapted to be secured to a bicycle crank, a pair of ball cups on said pin having upturned flanges on the outer ends, a plurality of balls in each of said cups, a pair of brace members mounted on the outer ends of said cups against the flanges, and a separate tube surrounding said pin and said ball cups, said tube being of uniform diameter to provide an uninterrupted inner wall for receiving said ball cups and permitting firm seating of the flanges thereof against said braces and the firm seating of the brace against the ends of the tube.

2. In a bicycle pedal, a pin adapted to be secured to a bicycle crank, a pair of brace members rotatably mounted on said pin, a pair of tread rods supported on said brace members and slidably disposed therebetween, each tread rod having a tubular tread mounted thereon, screws passing inwardly through said brace members and fitting in the opposite ends of said tread rods to retain the same from lateral displacement and secure the rods to the brace members and support the rods on the brace members, said screws being removable outwardly from said brace members for freeing the tread-carrying rods and permitting the sliding of the same laterally from between the brace members without disturbing said brace members.

3. In a bicycle pedal, a pin adapted to be secured to a bicycle crank, a pair of brace members rotatably mounted on said pin, a pair of tread-carrying rods supported on said brace members and laterally slidable therebetween, detachable tubular treads surrounding said tread-carrying rods, and means adapted to be manipulated from outside said brace members for detachably securing said tread rods in position, whereby said treads may be removed from said tread rods without disturbing said brace members.

4. In a bicycle pedal, a pin adapted to be secured to a bicycle crank, a pair of brace members rotatably mounted on said pin, a pair of hollow tread-carrying rods supported on said brace members, said rods having interior screw threads at their extremities, screws passing through said brace members for engaging with said crew threads, and detachable tubular treads on said tread-carrying rods, said screws being outwardly removable to permit said treads and tread rods to be slid outwardly radially from said pin without disturbing said brace members.

5. In a bicycle pedal, a pin adapted to be secured to a bicycle crank, a pair of brace members rotatably mounted on said pin, a pair of tread rods carried by said brace members, tubular tread members fitted on said rods and slidable radially outwardly from the axis of said pin, the opposite ends of said tread rods having interior threads and screws passing inwardly through said brace members and engaging said threads, said screws being detachable outwardly to permit removal of said tread rods and treads without disturbing said brace members.

6. In a bicycle pedal, a pin adapted to be secured to a bicycle crank, a pair of brace members rotatably mounted on said pin, a pair of tread rods located between said brace members tubular tread members on said tread rods, and outwardly detachable screws passing through said brace members and engaging the extremities of said rods for supporting said treads and tread rods, said treads and tread rods being removable radially outwardly when said screws are detached without disturbing said brace members.

7. In a bicycle pedal, a pin adapted to be secured to a bicycle crank, a pair of brace members rotatably mounted on said pin, a pair of tread rods located entirely between said brace members, tubular tread members slidably and rotatably fitted on said tread rods, means passing through said brace members and engaging said tread rods for securing said rods and tread members in position, said securing means being removable outwardly in a direction perpendicular to the plane of said brace members to permit said tread members and tread rods to be slid out from between said brace members in a radial direction from the axis of said pin.

8. In a bicycle pedal, a pin adapted to be secured to a bicycle crank, a pair of tread-holding brace members rotatably mounted on said pin, a pair of ball cups on said pin having flanges on their outer ends, said flanges being seated against said brace members, and a separate tube surrounding said pin and said ball cups, the ends of said tube being cylindrical and firmly seated against said brace members.

9. In a bicycle pedal, a pin adapted to be secured to a bicycle crank, a pair of ball cups on said pin having upturned flanges at their outer ends, a plurality of ball bearings in said cups for engaging said pin, a pair of brace members mounted on said ball cups and firmly seated against said flanges, and a dust-protecting and stiffening tube surrounding said pin, the ends of said tube abutting against the inside of said brace members and fiitting snugly over said ball cups, said tube being disconnected from said brace members.

10. In a bicycle pedal, a pin adapted to be secured to a bicycle crank, a pair of ball cups on said pin, a plurality of ball bearings in said cups for engaging said pin, a pair of brace members mounted on the outer ends of said ball cups, and a dust-protecting and stiffening tube surrounding said pin, the ends of said tube abutting against the inside surfaces of said brace members and fitting over said ball cups, said tube and said brace members being constructed of separate pieces.

11. In a bicycle pedal, a pin adapted to be secured to a bicycle crank, a pair of ball cups on said pin, a plurality of balls in said cup for bearing against said pin, a pair of flat tread-holding members mounted on the outer ends of said ball cups, and a dust-protecting and stiffening tube surrounding said pin and said ball cups, said tube being formed in a separate piece from said tread-holding members and terminating at the inside faces of said tread-holding members, said tread-holding members being located in planes between the tracks of said balls and the ends of said pin.

In testimony whereof, I have affixed my signature to this specification.

JAMES H GRAHAM.